United States Patent [19]

Trutna

[11] 4,361,469

[45] Nov. 30, 1982

[54] PROCESS FOR USING COCURRENT CONTACTING DISTILLATION COLUMNS

[76] Inventor: William R. Trutna, 2213 Fenwood, Pasadena, Tex. 77502

[21] Appl. No.: 234,794

[22] Filed: Feb. 17, 1981

[51] Int. Cl.³ .......................... B01D 3/14; B01D 3/24
[52] U.S. Cl. ...................................... 203/99; 202/158; 203/DIG. 22; 261/114 R
[58] Field of Search .................... 55/444, 464; 203/99, 203/DIG. 22; 202/153, 154, 156, 158, 162, 267 R, 267 A; 261/114 R, 114 TC, DIG. 11; 196/98–100, 115, 125, 133, 155

[56] References Cited

U.S. PATENT DOCUMENTS

| 801,211 | 10/1905 | Butzow | 55/444 |
| 1,655,998 | 1/1928 | Gilmore | 196/125 |
| 1,764,190 | 6/1930 | Bell | 196/98 |

Primary Examiner—Frank Sever
Attorney, Agent, or Firm—Carl B. Fox, Jr.

[57] ABSTRACT

Apparatus for use in fractionation, stripping, absorption, and the like, wherein a column or tower has plural vertically spaced trays each consisting of two vertically spaced rows of strips which are parallel and of which the strips of the lower row are centered below the spaces of the upper row, and has a separator above each said tray consisting of plural vertically spaced rows of upwardly facing channels which are parallel and of which the channels of one row are centered between the channels of the adjacent row or rows, the trays and separators occupying a major portion of the cross sectional area of the tower and the remainder of the cross sectional area of the tower being occupied by downcomers, whereby the tower has a major portion of its cross sectional area used for upflow of vapor and liquid, or vapor. The towers or columns according to the invention result in reduced size and cost as compared with conventional apparatuses, and result in improved efficiencies and performance.

15 Claims, 9 Drawing Figures

PROCESS FOR USING COCURRENT CONTACTING DISTILLATION COLUMNS

BACKGROUND OF THE INVENTION

Distillation is a major factor in the capital and operating costs for the petroleum refining, synthetic fuel, petrochemical, and chemical industries. Most distillation operations are conducted in tray towers in which the liquid flows across the trays and down the column by way of downcomers, while the gas passes upward through the trays. Mass transfer occurs in the liquid-gas mixtures near the bottom of each tray. Phase separation, necessary to secure overall countercurrent flow of gas and liquid, occurs by gravity because of the spaces between the trays. Reduction in the size and cost of distillation columns would be of major benefits to the industries mentioned above, but such reductions are difficult if not impossible to achieve with respect to the distillation column equipment presently and heretofore known. Because of the principals according to which conventional distillation equipment operates, relatively large vertical separation between adjacent trays is necessary to achieve adequate phase separation. Reduction of horizontal dimensions of distillation columns is not practical because reductions of the spaces between the elements employed would result in diminishment of the distillation column capabilities. This invention seeks to provide methods and apparatus for distillation and related processes in which the apparatus is of substantially reduced size and cost, yet which efficiently accomplishes adequate separations by the processes.

Discussion of the Prior Art

Current commercial distillation equipment is described in the references listed below, including references to packed columns which may be competitive with current commercial tray columns. The tray types described include bubble cap trays, valve trays, and others. The references are as follows:

Perry and Chilton, Chem. Eng. Handbook, Fifth Edition, Section 18, *McGraw-Hill*, 1973.

Smith, Buford D., "Design of Equilibrium Stage Processes", *McGraw-Hill*, 1963.

Van Winkle, Matthew, "Distillation", *McGraw-Hill*, 1967.

Stringle, Jr., R. F., et al, "Packed Distillation Column Design", *Chem. Eng. Progress*, March 1979, p. 86-91.

Fair, Jr., R., "Advances in Distillation System Design", *Chem. Eng. Progress*, Nov. 1977, p. 78-83.

Delnicki, W. V. et al, "Performance of Multiple Downcomer Trays", *Chem. Eng. Progress*, March 1970, p. 50-55.

Weiler, D. W. et al, "Flow Hydraulics of Large Diameter Trays", *Chem. Eng. Progress*, Oct. 1973, p. 67-72.

The use of a gas-liquid separator occupying the entirety of the horizontal column cross sectional area, except for the area occupied by the downcomers, is illustrated by Krischbaum, "Destillier-Und-Rektifiziertechnik", Springer, Verlag, 1960, pages 286 and 287. The equipment described is similar to the subject invention in terms of the column area occupied by the separator, but does not reveal the subject invention in that the liquid collected is returned to the tray below the separator instead of going to the next tray down by way of a downcomer, in that the channel type gas-liquid separator provided according to the subject invention is different from the baffle-type separators shown by Krischbaum, and in that cocurrent upward flow of the gas-liquid mixture using vapor velocities double or more than those used in the prior art, from the tray to the gas-liquid separator is not used in Krischbaum.

A cocurrent flow pattern for mass transfer combined with the use of a gas-liquid separator has been studied in the laboratory and pilot plant by a number of investigators, including the following:

Zhavoronkov, Malyusov, and Malafeev, "Rectification in Columns with Co-current Flow Contactors", *I. Chem. E. Symposium Series No.* 32 (1969, Inst. Chem. Engrs. London, pages 48-53).

Pfeiffer et al, "Multi-stage Cocurrent Contacting Equilibrium Units", *Industrial Eng. Chem, Process Design Development*, Vol. 10 No. 3, 1971, p. 380-384.

Although the overall flow pattern of the liquid and gas in the foregoing references is similar to that according to the subject invention, the subject invention differs in a major way in that according to the subject invention cocurrent upward flow occupies the entire column area except for the liquid downcomer areas, whereas in the prior art one or a number of tubes or conduits in parallel are used, these severely restricting the flow area as compared to the flow area potentially available. The fractionating column of the subject invention uses a new unique channel type gas-liquid separator which is distinct as compared with the separators conventionally used in the prior art. The subject invention uses a special novel strip type tray to distribute the liquid into the vapor, which is distinct from the feeding of the liquid through holes in vapor conduit walls used in existing cocurrent upward flow distillation apparatuses.

A review of the literature, patents, and industrial practice discloses no gas-liquid separator similar to the channel separator used in the subject invention. Gravity separation is conventionally used in commercial tray distillation columns. Gas-liquid separation equipment, also referred to as entrainment separators, is described in the following references:

Perry and Chilton, Chemical Eng. Handbook, Fifth Edition, *McGraw-Hill*, 1973, section 18, p. 85.

Montrose, Charles F., "Entrainment Separation", *Chem. Eng.*, Oct. 1953, p. 213.

Koch Engineering Company, Inc., *Eng. Manual*, Bulletin KPC 2.

Fair, James R. et al, "Trace Quantity Engineering", *Chem. Eng.*, Aug. 7, 1972, p. 70-71.

The following patents should be considered as probably the most pertinent patents to be found in the prior art, namely, U.S. Pat. Nos. 981,058 to Buring; 1,974,768 to Daniels et al.; 2,197,189 to Morgan; 668,866 to Young; and 855,185 to Serrell. The equipment described in these patents and the literature references mentioned above do not reveal the configuration, flow pattern and in situ collection of liquid in nominally horizontal open channels as described in connection with the subject invention. The subject invention discloses channel separators which provide good separation of the liquid and vapor from the gas-liquid mixture flowing cocurrently upward to it while using superficial vapor velocities in the order of twice those used in existing distillation columns and which include small depth requirements and low pressure drop, with the ability to deliver the liquid to a downcomer, these being major factors in achieving major reductions in distillation column size.

The energy requirements for distillation in the United States are described by T. J. Mix et al in "Energy Conservation in Distillation", *Chemical Engineering Progress,* April, 1978, pp. 49–55. Decreases in distillation energy requirements of from five to ten percent, equivalent to fifty thousand to one hundred thousand barrels of oil per day, respectively, can be obtained by a ten to twenty percent increase in the number of stages. Because of the lower stage costs according to the invention, it is attractive to increase the number of stages in equipment provided according to the invention. The low pressure drops achieved according to the invention facilitate the use of lower cost energy, and make energy recover more attractive.

According to my invention liquid feeding into the downcomers, furnished by the gas-liquid separators, is essentially free of foam as compared to a highly aerated mass according to existing fractionation practice. The absence of foam permits downcomer liquid velocities in the order of twice as high as those obtainable in existing tray columns. The large reduction in horizontal column area obtained from my invention is accordingly obtained through the use of both higher gas and liquid velocities.

The same principals and methods employed according to the invention for improving the performance of distillation columns also apply to absorbers and strippers, which are also commonly used in petroleum and related industries. Therefore, when a fractionating column is referred to in the subsequent descriptions of this application, it is intended to include any countercurrent stage mass transfer device handling liquids and gases.

SUMMARY OF THE INVENTION

The invention provides unique stage mass transfer devices for countercurrent contacting of gases and liquids. While the overall flow of liquid and gas is countercurrent, the flows within each stage, initiated at the trays, are cocurrent, and occupy the entire column horizontal area except for the area needed for the liquid downcomers. Gas-liquid separation is achieved according to the invention by a novel type of separator which occupies the upper portion of the zone between the trays. The separators each consist of several nominally horizontal rows or levels of open channels or conduits, which have open tops and which are disposed in vertically spaced parallel rows, the individual channels being disposed triangularly with respect to others in the vertical direction. The liquid-gas mixture flows upward through the rows or levels of channels, and the vapor space above each channel row is essentially isolated from the vapor space above every other channel row. The liquid collected in the channels of each channel row or level is discharged to a sealed downcomer which delivers the liquid to the tray of a lower stage. The special tray consists of two horizontally offset vertically spaced rows of thin horizontal strips, with the top row of strips forming parallel conduits for distribution of the liquid.

The separator is applicable to any separation involving liquid and gas, as for example, entrainment removal.

A principal object of the invention is to provide methods and apparatuses for distillation which provide major reductions in the size and capital cost of the distillation columns, together with significant reductions in the energy costs for their operation. Another object of the invention is to provide such methods and apparatus wherein the vertical spacing between apparatus elements is reduced. A further object of the invention is to provide such methods and apparatuses wherein substantially the full horizontal areas in the columns are employed effectively for mass transfer using cocurrent upward flow of vapor and liquid at relatively high velocities. Yet another object of the invention is to provide such methods and apparatuses which are economical, simple in operation, yet efficient and dependable in operation.

Other objects and advantages of the invention will appear from the following detailed descriptions of preferred embodiments, reference being made to the accompanying drawings.

DESCRIPTIONS OF THE PREFERRED EMBODIMENTS

Figures 1, 2, 8, 9:
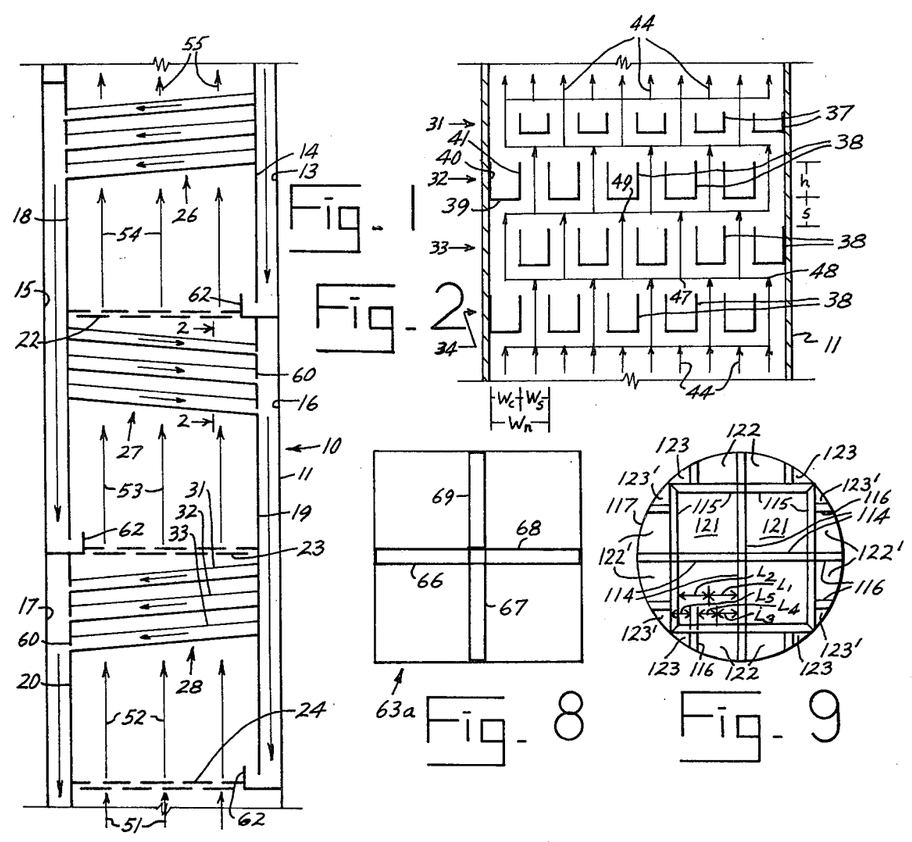
FIG. 1 is a schematic vertical axial cross section showing a distillation column and its manner of operation according to the invention.
FIG. 2 is a schematic transverse cross section taken at line 2—2 of FIG. 1, but including an additional row of channels.
FIGS. 8 and 9 are schematic drawings indicating different internal configurations which the apparatus according to the invention may take.

Referring now to the drawings in detail, and first to FIGS. 1 and 2, the column 10 includes an outer shell or wall 11 which may have any suitable horizontal cross section such as circular, square, rectangular, oval, or others. Downcomer passage 13 is provided at one wall of shell 11 by a wall 14. Additional downcomer passages 15, 16 and 17 are defined by shell 11 and walls 18, 19 and 20, respectively.

Adjacent the lower end of downcomer passage 13, a plate 22, shown oriented 90° in its plane from its normal position to illustrate an end view, is disposed transversely across the column interior, and similar or identical plates 23, 24 are disposed transversely across the column interior at the lower ends of downcomer passages 15 and 16, respectively. The plates have a novel design which will be further described later in the application. Above each plate 22, 23, 24 there is disposed a gas-liquid separator 26, 27, 28, respectively, each separator 26, 27, 28 consisting of plural vertically spaced rows or levels 31-33 of horizontally spaced parallel channels, the latter being best shown in FIG. 2. FIG. 2 shows a fourth row of channels, not shown in FIG. 1, referred to by reference numeral 34.

The individual channels 37 or 38 are each in the form of an elongate open top channel of rectangular cross section having a bottom 39 and sidewalls 40, 41. As shown in FIG. 2, the channels 37 may be, and preferably are, of lower vertical height than the channels 38 therebelow. The channels are spaced apart vertically and horizontally as indicated in FIG. 2, the upward gas-liquid flow pattern therepast being indicated by the array of arrows 44. The upflowing gas-liquid mixture consists of one or any combination of the following aerated liquid, foam, spray or gas having entrained liquid droplets carried thereby. Because of the changes in flow direction, such as 47–49, the gas-liquid mixture is thrust against the channels separating the liquid which is collected in the channels, so that a substantially complete separation of the liquid from the upflowing gas stream occurs. A description of the function and effectiveness of the channels will appear later.

The fractionating column shown in FIG. 1 may have any number of stages, only three stages being shown. Feed vapor enters at the bottom of the column and flows upwardly as indicated by arrows 51. The vapor contacts liquid which is delivered to tray 24 through downcomer 16, and a highly agitated mixture of vapor and liquid flows upward through the column as indicated by arrows 52. Substantially all of the liquid is separated from the vapor at separator 28, and the vapor then continues up the tower past tray 23, to which liquid is supplied through downcomer 15. Again, a stream of liquid and vapor flows cocurrently upward as indicated by arrows 53 through separator 27, where the liquid is separated from the gas-liquid mixture. The separated vapor flows upwardly past plate 22, to which liquid is supplied through downcomer passage 13, and the resulting gas-liquid mixture flows upwardly as indicated by arrows 54, through separator 26. Assuming that separator 26 is at the upper end of the column, the separated vapor continues upwardly leaving the column as indicated by arrows 55 and feed liquid to the column is introduced through downcomer 13. Should separator 26 not be at the upper end of the column the separated vapor 55 continues upwardly through the column and the liquid supply through downcomer passage 13 is supplied from a separator higher up in the column. The liquid separated by separator 26 flows downwardly through downcomer passage 15 to plate 23. The liquid separated by separator 27 flows downwardly through downcomer passage 16 to plate 24. The liquid separated at separator 28 flows downwardly through downcomer passage 17 either out of the column or to a plate further down in the column.

The dimensions as to size and the configurations of the channels 37, 38 are shown in FIG. 2, where "h" is the height of channels 38, "S" is the vertical distance between channel rows, "$W_c$" is the channel width, "$W_s$" is the horizontal space between the channels, and "$W_n$" is the sum of "$W_c$" and "$W_s$". It is advantageous to make "$W_n$" small to reduce the height of the separator, and a small "$W_n$" is necessary for removal of small liquid particles, but a "$W_n$" below 0.5 inch can significantly reduce liquid handling capacity because of surface tension effects. Separator costs tend to be reduced as "$W_n$" is increased. A "$W_n$" of one inch to two inches is typical for fractionating columns according to the invention. Of course "h" must be great enough to handle the liquid flow. Approximate ratios of the dimensions illustrated in FIG. 2 for various design objectives are shown in Table I, below. For the top stage, stage 31 of FIG. 2, the ratio of $$\frac{h}{W_c}$$

should be less than 0.5 to create the vortex needed to secure sufficient horizontal flow.

TABLE I

RATIOS OF SEPARATOR ELEMENT DIMENSIONS FOR VARIOUS DESIGN OBJECTIVES

| Design Objective | $\frac{W_c}{W_n}$ | $h/W_c$ (except top stage) | $\frac{2S}{W_n}$ |
|---|---|---|---|
| Minimum pressure drop | 0.50 | 1.5 minimum | 1.5 |
| Normal | 0.52 to 0.55 | 0.8 minimum | 1.0 |
| Remove small particles | 0.60 | 0.5 minimum | 0.7 |

As indicated in FIG. 1, the channels 37, 38 of each separator 26-28 are sloped downwardly toward the downcomer to which the liquid is intended to flow. The channels are sloped downwardly toward the downcomer with a slope of the order of five to ten percent, to facilitate liquid discharge from the channels to the downcomers, and to secure relatively uniform liquid depth over the lengths of the channels. When using the normal open type downcomer, 13, 15, 16 and 17 of FIG. 1, the channels 38 have the outlets from the discharge ends of the channels reduced by skirts 60 to approximately the height of liquid in the channels in order to prevent excessive vapor flow into the downcomers. When using the alternate type downcomer, discussed later with reference to FIGS. 4–6, the skirts are not used. Each downcomer has a liquid seal chamber 62 at its lower end from which liquid flows onto the respective plate 22,23, or 24.

Figure 3:
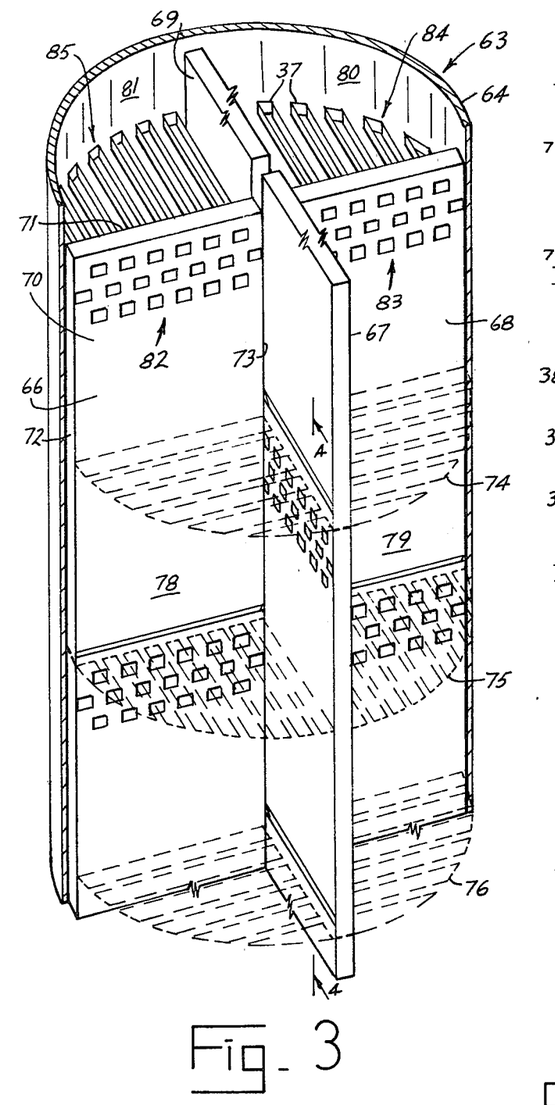
FIG. 3 is an upper perspective view, partly in vertical cross section, of a distillation column of preferred form according to the invention.

In the modified form of column 63 shown in FIG. 3, the outer shell 64 of the column is cylindrical, extending completely around the column. The downcomers 66–69 are disposed in the arrangement shown, each being in the form of a flat, vertical, structure. Downcomers 67, 69 are preferably separate, as shown, but a common downcomer structure extending completely across the column could be employed for half the downcomers in each stage if desired. In FIG. 3, the column 63 interior is divided into four internal quadrant portions by the downcomers. Each downcomer has opposite parallel sidewalls 70, 71 and opposite parallel end walls 72,73.

Column 63, in the portion thereof shown in FIG. 3, has three plates 74–76, these being indicated in incomplete form by dashed lines in order to improve the clarity of the drawing. It will be understood that a plate 74–76 will occur in each of the four quadrant portions 78–81 of the column. A separator 82, 83, 84, or 85 is provided in each quadrant 78–81, respectively, of the column, these being only partially shown. Only the upper row or level 31 of channels 37 is shown for separators 84, 85, while only the locations of the channels of separators 82 and 83 are indicated by the openings for the channels into the downcomers.

Figure 4:
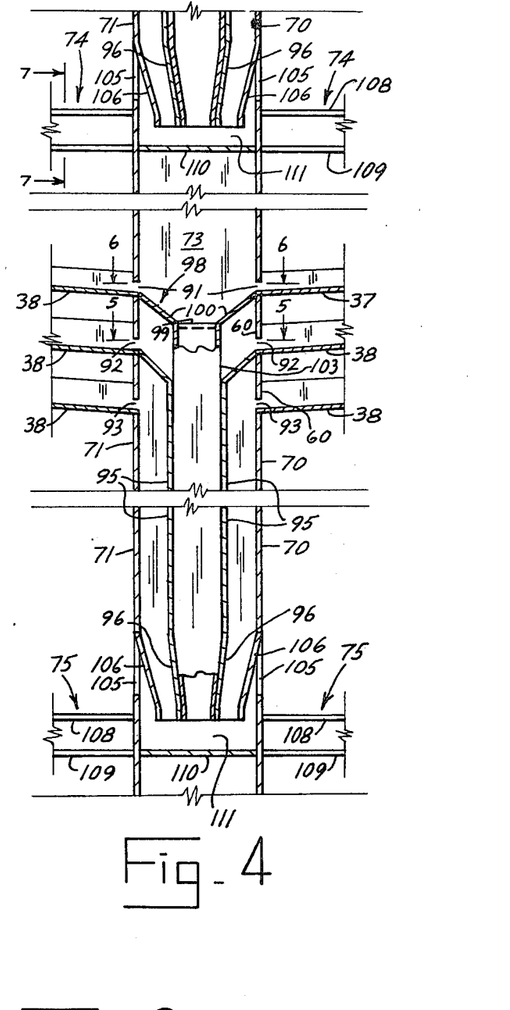
FIG. 4 is a vertical cross section taken at line 4—4 of FIG. 3.
Figures 5, 7:
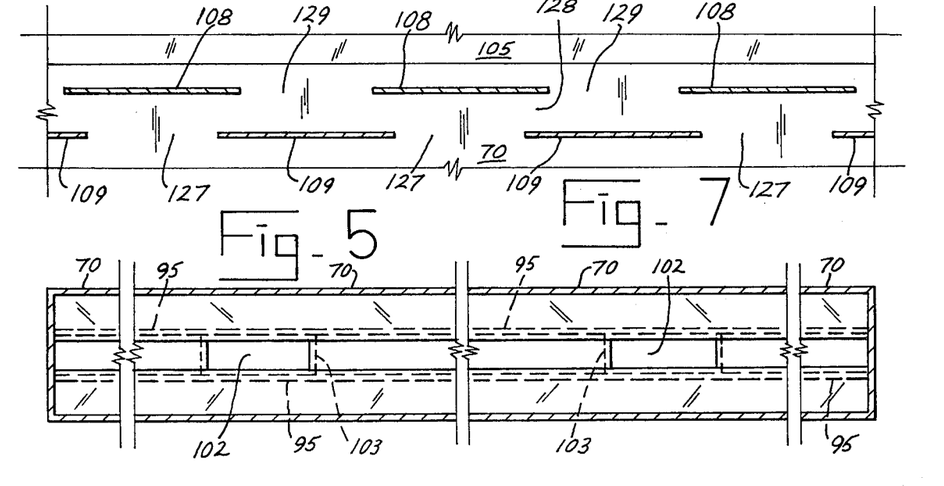
FIG. 5 is a horizontal cross section taken at line 5—5 of FIG. 4.
FIG. 7 is a vertical cross section taken at line 7—7 of FIG. 4.
Figure 6:
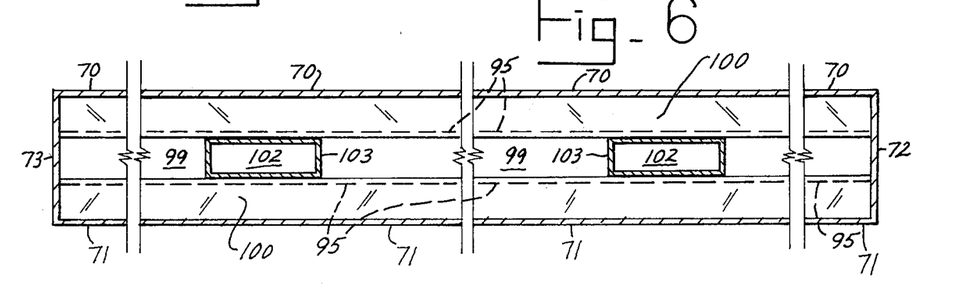
FIG. 6 is a horizontal cross section taken at line 6—6 of FIG. 4.

Referring now to FIGS. 4–6 of the drawings there is shown in FIG. 4 a vertical cross section showing the structures involved in the downcomer 67 to FIG. 3, the others being the same. The downcomer principles used are illustrated for a three stage separator but apply also to separators with a different number of stages. For the normal open type downcomer the walls 70–71, 105–106, and ends 72–73 form the downcomer and the internal stuctures 95, 96, 99, 100, etc. are not used. Channels 38 are shown at their discharge ends into the downcomer. The walls 70, 71 have openings to provide the flow passages 92–93 at the channel ends, as shown beneath the skirts 60, the bottom edge of the skirts can be rounded and the height of the opening below the skirt is approximately equal to the height of the liquid in the channel such that a liquid seal essentially isolates the downcomer from the space above the channels. The upper row of channels 37 at their discharge ends is also shown. Since the pressure in the downcomer and above the upper row of channels are nearly equal use of a skirt 60 to make the channel discharge passage 91 smaller than the channel is not essential. Plates 70, 71 each have openings 105 therethrough, angular plates 106 being sealingly connected at their sides and upper edge to the sides and upper edge of the openings 105, and being angularly disposed inwardly of openings 105, and extending somewhat below the lower edges of the openings 105.

Excessive vapor flows at the channel exit which can interfere with collection and delivery of liquid can also be prevented by providing a separate sealed downcomer for each channel row or stage. This alternative is advantageous where large variations in the liquid-gas ratio are encountered. From FIGS. 4–6 the flow passages 91–93 have heights equal to the channel height and the skirt 60 is not needed since the seal at the bottom of the downcomer passage is utilized to equalize the pressures above the channel and in the downcomer. Angularly formed plates 95 are disposed downwardly through the downcomer passage, spaced from each of walls 70, 71, the upper angular portions being connected to walls 70, 71 at or just below the entrances of the upper channels 37 into the downcomer. Plates 95 are slightly inturned at their lower ends 96, as shown. Plate 98 has a flat horizontal center portion 99 and angular side portions 100, the latter being upwardly and outwardly inclined to be connected to walls 70,71 at or just below the entrances of the channels 37 into the downcomer. Center portion 99 has openings 102 therethrough below which rectangular tubes 103 extend. The tubes 103 have their opposite sidewalls disposed against plates 95, as shown. Plates 95 and the lower ends of the tubes 103 extend downwardly to the same level as the lower edges of the plates 106.

Each plate or tray 74–76 of column 63, only plates 74, 75 being shown in FIG. 4, consists of vertically spaced upper and lower rows of thin horizontal plates 108, 109, the plates being staggered and horizontally overlapped as shown in FIG. 7.

For the normal open type downcomer configuration liquid collected in the channels 37, 38, flows through passages 91, 92, and 93 into the downcomer, formed by the outer walls 70, 71, 72, and 73 through which it flows downwardly to the seal receptacle 111 formed above plate 110. Although the pressure above the channels 38, below the top channels 37, is greater than that in the downcomer, excessive flow of vapor into the downcomer is prevented by a seal formed by the skirts 60 which make the height of the passages 92, 93 approximately equal to the liquid height in the channel. A fixed skirt 60 position is satisfactory for fractionating columns since channel liquid height does not vary significantly with operating rate. The small amounts of vapor occluded in the liquid or passing through the seals 60 flows upwardly and out the open top of the rectangular downcomer formed by the walls 70, 71, 72, and 73.

When the downcomer configuration providing a separate passage for each channel row is used, the liquid collected in the upper channel row 37 is delivered through openings 91, which are the same size as the channel since no sealing skirt should be used, onto plates 98 and then downwardly through tubes 103 to the seal receptacle 111. Similarly, the liquid in the row of channels 38, immediately below 37, is delivered through openings 92, equal to the channel size, onto the plates 95 and downwardly between the plates 95 and between the tubes 103 to the seal receptacle 111. Liquid entering the downcomer through openings 93, equal to the channel size, from the lowermost channels 38 flows between the walls 70, 71 and the plates 95 to the receptacle 111.

The receptacles 111, the lower ends of the plates 106 and the openings 105 form a liquid seal which in the case of the open type downcomer prevents vapor from flowing up the downcomer restricting downward liquid flow. When plates 95 and the tubes 103 are added a separate passage and separate liquid seal is provided for the channels of each row of channels which serves to prevent both vapor flow up the downcomer and from the downcomer into the space above the channels. Alternatively, other downcomer sealing systems, analagous to those described in the literature, can be used.

Referring to FIGS. 4 and 7, liquid flows from the downcomers onto the upper plates 108 in a direction parallel to the openings 129 between the plates. Most of the liquid spreads as in a passage along the upper tray plate surfaces, and to a lesser extent along the lower tray plates 109. The space 128 between the plates 108 and 109 is such that at relatively low vapor rates the vapor velocity is great enough to prevent significant liquid from falling to the separator below. The space 128 can be made variable by techniques similar to those used for conventional valve trays to avoid leakage or weeping over an extended range of vapor flow rates. The vapor and liquid flow cocurrently upward to the separator as a mixture of foam and spray at low operating rates and with the liquid largely in the form of suspended droplets at the normal high vapor rates. The horizontal overlap of plates 108, 109 of the trays can be varied to minimize pressure drop and/or cost. Pressure drop decreases as overlap increases until the space between the plates 129 becomes a restriction. Also, excessive overlap would increase costs. The degree of overlap as shown in the drawings will be satisfactory and is recommended for most purposes. More than two vertically spaced rows of plates 108, 109, might be employed, but such is not necessary or recommended. It is desired to have as little as possible flow restriction post the trays, and the addition of rows exceeding two rows of trays would increase the flow restriction.

It should be understood, with reference to FIG. 1, that the liquid from a separator, e.g. separator 27, does not flow down to the tray immediately below, but instead flows downwardly to the second tray below the separator.

Referring now to FIGS. 8 and 9 of the drawings, and first to FIG. 8, the column 63a is shown to be of square cross section, instead of having the circular cross section shown in FIG. 3. The downcomer structures 66–69 may be the same as in FIGS. 3–6. In a comumn designed in the manner of FIG. 8, all of the separator channels 37, 38 will be of the same length, instead of being of varying lengths as indicated for a circular column at the upper portion of FIG. 3. In FIG. 9, it is shown that a more complex arrangement of downcomers may be provided, made up of downcomer structures 114–116 within a circular column shell 117. The tray shown in FIG. 9 is one of every other tray in which the horizontal downcomers distribute liquid to the tray and the vertical downcomers collect liquid from the channels. Similar arrangements of downcomers may equaly well be provided in a square or rectangular column. Diverse arrangements of the downcomers may be provided in columns of any selected cross sectional shape, as desired, or as required by the fluid flow and other conditions.

The channels 37, 38 may have cross sections which are other than the square or rectangular cross sections shown, such as triangle or circular, but the square or rectangular crossections for the channels will be preferred because of the flow direction changes which result.

In the drawings, three or four vertical levels or stages are shown for the separators. Although separation efficiency is increased as the number of stages increases, permitting higher feed rates, the preferred number of separator stages for fractionating columns is three to four, because of the desirability of limiting pressure drop. The gas-liquid feed mixture flows upward through the separator, bounded by the wall of the column and/or by one or more downcomer walls, flowing in both vertical and horizontal directions between the channels as indicated by the array of arrows 44 shown in FIG. 2. Vapor exits above each separator with essentially all of the liquid removed. Impingements on the channel bottoms and on both the outside and inside walls of the channels converts dispersed liquid droplets into a continuous liquid phase. The liquid generated by impingement described above, together with some of the liquid still present as a mist in the gas, is collected in the insides of the channels as a result of gravity, since the vertical gas velocity is low directly above the upper sides of the channels, and by centrifugal force resulting from the changes in gas flow directions between horizontal to vertical flow directions.

The additional downcomers shown in the downcomer arrangement of FIG. 9 increases the cost of carrying liquid down the column, but enable reductions in the channel heights and channel lengths and facilitate the distribution of liquid on the trays. The optimum number of downcomers in such a column is normally such that the lengths of the separator channels in zone 121 is from one to two feet. The minimum downcomer widths are based such that a Froude number of 0.3 is not exceeded, to obtain self-venting flow through the downcomers, with the minimum being increased for the downcomers serving zones 121 in FIG. 9 such that $$\frac{L_1 + L_2}{W_n}$$

is a integer and $W_n$ is as described in connection with FIG. 2 of the drawings. Similarly, downcomer size is increased above the minimum such that $$\frac{L_3 + L_4}{W_n}$$

is an integer. Also, Also, $L_5 \geq L_3$ and $L_5 < 1.1\ L_3$ is desired in order to insure a maximum channel length in zone 123 not significantly different than the zone 122 channel lengths. Channels of varying lengths are used in zones 122 and 123. For zones 123 and 123' there is no significant advantage in using channels less than 2 inches in length, and the unchaneled areas are blanked off.

With regard to the trays, referring now again to FIG. 7, vapor flows upward through the openings 127 between the strips or plates 109 in the bottom row, and then flows laterally through the vertical space 128 between the upper and lower rows of plates, and then flows vertically through the openings 72 between strips or plates 108 of the top row. The free area of the tray, which usually ranges from fifteen to twenty-five percent, is determined by the height of the opening of space 128 between the two levels of strips. The horizontal spaces 129 between strips 108 and the corresponding spaces 127 between strips 109 are normally of the same size, and the resulting gas flow area is a minimum of 1.5 times the limiting tray free area determined by the height of space 128 between the two rows of strips. Liquid distribution over the tray strips is facilitated by the tendency of the liquid to flow in more or less confined channels formed by the top strips 108 and the upward flow of vapor around the sides of strips 108. The width of the strips plus the opening between adjacent strips is normally in the range of two to four inches. If the strips are too wide, poor distribution and a tendency to weep are encountered. If the strips are too narrow, tray costs are increased and plugging tendencies could be encountered in some systems.

The invention is further illustrated by the examples given below.

EXAMPLE 1

A tower is used which is four feet in diameter, contains three mass transfer stages, and has the overall gas and liquid flow pattern shown in FIG. 1. The tower has open rectangular downcomers as illustrated in FIG. 3, with the downcomer configuration shown in FIG. 9, and the tray type illustrated in FIG. 7 is used. A three stage gas-liquid separator with channels made from 28 gage metal and with dimensions as defined according to FIG. 2, having $W_n=1$ inch, $W_c=0.52$ inch, $W_s=0.48$ inch, and $S=0.5$ inch is installed above each mass transfer stage. The maximum channel length ($L_1=L_2$ as shown in FIG. 3) is 7.5 inches and the channel slope is 5% toward discharge. The corresponding channel heights h for each row or stage starting from the bottom are 0.35, 0.33, and 0.24 inches respectively. Based on the maximum anticipated liquid rate, the opening at discharge for the bottom channels is 0.15 inch high and for the middle channels 0.14 inch high (see FIG. 4). The separator has an average height of 2.6 inches and the highest level is one half inch below the tray above. The tray-separator spacing is 10 inches. The horizontal tray area and the horizontal area occupied by the separator are essentially the same, and amount to 76.8% of the horizontal column area. The remaining 23.2% of the column area is occupied by the downcomers. The tray is as described in FIGS. 4 and 7, with 16 gage strips 1.15" wide and a 0.85 inch space between the strips and a spacing between the rows of strips to give 23% free area.

Water at the rate of 115 gallons per minute was fed to the downcomer for distribution to the top tray. Air containing 1 to 2% $NH_3$ was introduced below the bottom tray at a design capacity rate of 8690 cu.ft./min.

The Murphy stage efficiency of $NH_3$ absorption was 74% and the pressure drop per tray was 4.1 inches of water.

Corresponding performance for a ½ inch hole sieve tray of the same diameter with a 24 inch tray spacing is a design capacity of 4120 cu.ft./min., 62% tray absorption efficiency, and a pressure drop per tray of 4.6 inches of water.

EXAMPLE 2

An equimolar mixture of cyclohexane and n-heptane at its boiling point was fractionated into 98 mol % overhead and bottoms products. The feed rate was 1274 mols/hr. and the reflux rate was 1.25 times the minimum.

The overall gas and liquid flow pattern is illustrated in FIG. 1. The fractionating column used had the downcomer locations as illustrated in FIG. 9, the downcomer and channel discharge as shown in FIG. 4, but without plates 95, 98 and 100 to maintain the downcomer flows separated, and the tray type shown in FIG. 7.

A four stage separator with 28 gage metal channels sloped 5% toward discharge and with a channel size and spacing of $W_n=1$, $W_s=0.48$, and $S=0.5$, as defined in connection with FIG. 2, was used. The channel lengths, heights, and discharge opening heights, which are equal to the liquid height at the maximum liquid flow rate, are set forth below in Table II for the vapor flow areas of the column.

TABLE II

| Separator Channel length ($L_1 = L_2$) inches Stage no. | Stripping Section 15 | | Rectifying Section 14.5 | |
|---|---|---|---|---|
| | Channel ht. inches | Channel Discharge ht. in. | Channel ht inches | Channel Discharge ht. in. |
| 1 (bottom) | 0.7 | 0.29 | 0.5 | 0.22 |
| 2 | 0.7 | 0.33 | 0.5 | 0.22 |
| 3 | 0.7 | 0.32 | 0.5 | 0.20 |
| 4 (top) | 0.5 | — | 0.4 | — |

The major dimensions and operating parameters are shown below in Table III.

TABLE III

| | Stripping Section | Rectifying Section |
|---|---|---|
| Column Diameter, ft | 8.5 | 7.67 |
| No. of trays | 19 | 18 |
| Tray spacing, inches | 15 | 14 |
| Tray free area, % | 24.4 | 25.1 |
| Downcomer area as % of total column area | 29.2 | 21.1 |
| % Liquid fed to tray collected in separator | 93.5 | 93.9 |
| Stage Fractionating efficiency, % | 91.9 | 91.2 |
| F*(factor based on total column area) | 2.82 | 3.47 |

| | Total Column |
|---|---|
| Pressure drop, mm Hg | 316 |
| Height, ft. | 65 |
| Volume, ft.$^3$ | 3350 |

*Vapor velocity in ft./sec. multiplied by the square root of the vapor density in lbs./cu.ft.

EXAMPLE 3

This example is identical to Example 2, except that the number of stages in the gas-liquid separator was reduced from four to three, while retaining Example 2 channel size, slope and configuration.

This example also illustrates the gas-liquid separator design and liquid distribution modifications for the zones 121, 122, 122', 123, and 123' shown in FIG. 9. The channel length, channel height and discharge opening heights are shown for zones 121 and 122[1] in Table IV below. These zones have a constant channel length and comprise 77.3% of the total area occupied by the gas-liquid separator.

TABLE IV

Separator Data for Zones 121 and 122'
Dimensions in inches

| | Stripping | | | | Rectifying | | | |
|---|---|---|---|---|---|---|---|---|
| Channel length | Zone 121 $L_1 = L_2$ 17.5 | | Zone 122' $L_3 = L_4$ 11.5 | | ZONE 121 $L_1 = L_2$ 16.5 | | ZONE 122' $L_3 = L_4$ 11.5 | |
| Stage No. | Ch. ht. | dis- ch. ht. | ch. ht. | dis- ch. ht. | ch. ht. | dis- ch. ht. | ch. ht. | dis- ch. ht. |
| 1 & 2 | 0.68 | 0.45 | 0.48 | 0.30 | 0.63 | 0.30 | 0.50 | 0.22 |
| 3 | 0.41 | — | 0.31 | — | 0.39 | — | 0.31 | — |

Although the channel lengths vary in Zones 122', 123, and 123', the channel heights are constant and are based on the longest channel length in each zone. The channel heights for the zones are shown in Table V below:

TABLE V

Channel Heights (inches)

| | Stripping | | | Rectifying | | |
|---|---|---|---|---|---|---|
| Stage No. | Zone 122 | Zone 123 | Zone 123' | Zone 122 | Zone 123 | Zone 123' |
| 1 & 2 | 0.64 | 0.40 | 0.45 | 0.60 | 0.34 | 0.43 |
| 3 | 0.39 | 0.27 | 0.30 | 0.37 | 0.24 | 0.28 |

In proceeding down the column to the stage below the zones change as follows:

| Tray | Zones | | |
|---|---|---|---|
| n | 122 | 123 | 123' |
| n + 1 | 122' | 123' | 123 |

Since the areas in Zones 122', 123', and 123 opposite each unit lengths of weir vary, and are normally less than the corresponding area opposite the inlet weir on the other side of the downcomer, varying restrictions in the inlet weir discharge are required. The inches of weir length for liquid discharge per inch of downcomer length for locations throughout the downcomer length are shown for zones 122', 123', and 123 in Table VI. The corresponding channel lengths and channel discharge opening heights are also given.

TABLE VI

Channel Lengths, Height of Discharge Opening, and Fractional Free Area for Inlet Weir
(Dimensions in inches)

| Distance along down-comer | Stripping | | | Rectifying | | |
|---|---|---|---|---|---|---|
| | Weir disch. | Channel Lengths | Height Disch. | Weir disch. | Channel Lengths | Weight disch. |
| | Zone 122 | | | | | |
| 1 | 1.00 | 16.3 | 0.42 | 1.00 | 15.2 | 0.29 |
| 5 | 1.00 | 16.0 | 0.42 | 1.00 | 14.9 | 0.28 |
| 10 | 1.00 | 15.1 | 0.40 | 0.94 | 14.0 | 0.27 |

TABLE VI-continued

Channel Lengths, Height of Discharge Opening, and Fractional Free Area for Inlet Weir
(Dimensions in inches)

| Distance along downcomer | Stripping | | | Rectifying | | |
|---|---|---|---|---|---|---|
| | Weir disch. | Channel Lengths | Height Disch. | Weir disch. | Channel Lengths | Weight disch. |
| 15 | 0.88 | 13.9 | 0.36 | 0.85 | 12.6 | 0.24 |
| 20 | 0.77 | 12.1 | 0.31 | 0.72 | 10.7 | 0.20 |
| 23 | 0.68 | 10.7 | 0.28 | 0.62 | 9.2 | 0.18 |
| Zone 123 | | | | | | |
| 1 | 0.90 | 9.7 | 0.25 | 0.79 | 8.0 | 0.15 |
| 4 | 0.71 | 6.8 | 0.18 | 0.60 | 6.1 | 0.12 |
| 7 | 0.48 | 4.6 | 0.12 | 0.38 | 3.8 | 0.07 |
| 9 | 0.31 | 3.0 | 0.08 | 0.21 | 2.1 | 0.04 |
| 10 | 0.22 | 2.1 | 0.05 | — | — | — |
| Zone 123' | | | | | | |
| 1 | 0.71 | 11.1 | 0.29 | 0.69 | 10.3 | 0.20 |
| 3 | 0.57 | 9.0 | 0.23 | 0.54 | 8.0 | 0.15 |
| 5 | 0.42 | 6.5 | 0.17 | 0.37 | 5.5 | 0.10 |
| 7 | 0.24 | 3.7 | 0.10 | 0.17 | 2.6 | 0.05 |
| 8 | 0.14 | 2.2 | 0.06 | — | — | — |

The major dimensions and operating parameters for the cocurrent column are shown in Table VII:

TABLE VII

Cocurrent Column Dimensions and Operating Parameters

| | Stripping Section | Rectifying Section |
|---|---|---|
| Diameter - feet | 9.42 | 8.75 |
| Tray spacing - inches | 11 | 10 |
| Number of stages | 20 | 19 |
| Tray free area - % | 22.2 | 24.5 |
| Downcomer area as % of total column area (1) | 23.4 | 19.5 |
| % liquid fed to tray collected by separator | 95.0 | 95.3 |
| Stage Fractionation efficiency % | 89.1 | 86.0 |
| F factor based on total column area | 2.29 | 2.97 |

| | Total Column |
|---|---|
| Pressure drop mm Hg | 196 |
| Height - feet | 53.8 |
| Volume - cu.ft. | 3448 (2) |

(1) The width of the downcomers is slightly different in each location but is about three inches in the stripping section and two to two and half inches in the rectifying section.
(2) A conventional column to achieve the same separation at the same rate would have a volume of about 12,000 cu. ft.

EXAMPLE 4

This example is identical to example 3 except that the three stage gas-liquid separator has a channel spacing of $W_n = 2$ inches instead of 1 inch, a distance between channels $W_s = 0.96$ inch instead of 0.48 inch, and the distance between rows $S = 1.2$ inches instead of 0.5 inch. The nomenclature is illustrated in FIG. 2.

The channel lengths, heights and discharge opening heights are illustrated below for Zone 121 areas as defined in FIG. 9. The channels have a 5% slope toward the discharge end. The discharge opening height is equal to the liquid height at the channel discharge for maximum liquid flow.

TABLE VIII

| | Stripping Section 20 | | Rectifying Section 18 | |
|---|---|---|---|---|
| Channel length ($L_1 = L_2$) inches Stage no. | ch.ht. inches | disch. ht. in. | ch.ht. inches | disch. ht. in. |
| 1 (bottom) | 0.88 | 0.37 | 0.69 | 0.30 |
| 2 | 0.88 | 0.41 | 0.69 | 0.27 |
| 3 (top) | 0.60 | (1) | 0.49 | (1) |

(1) There is no restriction in the channel discharge for the top stage since the pressure in the downcomer and above liquid in the channel are essentially the same.

The trays, made from 16 gage strips, are described in Table IX, below, together with the diagrams and reference numbers in FIG. 7.

TABLE IX (Dimensions in inches)

| | Stripping Section | Rectifying Section |
|---|---|---|
| Fractional free area based on clearance 128 between rows | 0.182 | 0.205 |
| Strip width plus space between strips 108 or 109 | 3.0 | 3.0 |
| Clearance or space 128 between rows | 0.273 | 0.308 |
| Strip width 108 or 109 | 1.68 | 1.70 |
| Space 129 or 127 width | 1.32 | 1.30 |
| Plate row free area 129/(108 + 129) or 127 (109 + 127) | 0.439 | 0.432 |

The major dimensions and operating parameters for this example using channels twice as large as in the previous example are shown below, in Table X:

TABLE X

| | Stripping Section | Rectifying Section |
|---|---|---|
| Diameter, feet | 10.58 | 9.25 |
| Tray spacing, inches | 10.5 | 10.0 |
| Number of stages | 21 | 20 |
| Tray free area, % | 18.2 | 20.5 |
| Downcomer area, % of total col. | 21.0 | 17.2 |
| % liquid fed to tray collected by separator | 95.0 | 95.2 |
| Stage fractionation efficiency % | 83.2 | 84.5 |
| F factor based on total column area | 1.82 | 2.39 |

| | Total Column |
|---|---|
| Pressure drop mm Hg | 156 |
| Height, feet | 54.5 |
| Volume, cu.ft. | 4296 |

EXAMPLE 5

In this example the column design summarized in Example 2 is modified to use downcomers which provide individual passages and seals for the discharge of each row or stage of the gas-liquid separator.

The normal operating feed rate under the same operating conditions as in Example 2, i.e., reflux ratio, pressure drop, stage efficiency was 1120 mols/hr. as compared to 1274 mols/hr. under the Example 2 design conditions. The rate reduction resulted from the larger downcomers needed to provide the individual passageways.

EXAMPLE 6

This example is the same as Example 3 except that the feed rate of 1274 mols/hr. used in example 3 is reduced in half or to 637 mols/hr. This reduction in rate reduces the total column pressure drop to 125 mm from 196 mm and raised the stage fractionation efficiency from 89.1% to 91.5% in the stripping section and from 86 to 91.2% in the rectifying section. The fraction of liquid collected in the gas-liquid separators goes from about 95% to about 99.5%.

EXAMPLE 7

A separation of propane-propylene at 225 psia is desired. A vapor flow of 55.5 ft.3/sec. and a liquid flow of 1620 gal/min. is used. The vapor density is 2.1 lbs/cu.ft. and the liquid density is 30.1 lbs/cu.ft. The number of theoretical trays needed for the separation is 140. The fractionation requirements for both a conventional sieve plate column and my cocurrent column were calculated. The cocurrent column used a three stage gas-liquid separator, the open configuration of downcomer as illustrated in FIG. 4, but with the internal elements absent, having the downcomer locations shown in FIG. 9, and the tray design illustrated in FIG. 7. The comparison is tabulated below in Table XI:

TABLE XI

|  | Conventional Tray | Cocurrent |
|---|---|---|
| Active tray area, sq. ft. | 65.5 | 38.8 |
| Downcomer area, sq. ft. | 26 | 16.7 |
| Total area, sq. ft. | 91.5 | 55.5 |
| Diameter, feet | 10.75 | 8.41 |
| Tray efficiency, % | 85 | 92 |
| Tray spacing, inches | 20 | 10 |
| Number of actual trays | 165 | 153 |
| Trayed height, feet | 275 | 127.5 |
| F factor based on total column area | 0.88 | 1.45 |

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:

1. In a process for fractionating, entrainment removal, absorption, stripping, or the like, the improvement comprising, providing a tray type tower apparatus enabling reduction of tray spacing and reduction of horizontal apparatus area and thereby reducing apparatus cost, while enabling very high vapor velocity upward through the apparatus and resulting in high operating efficiency, comprising vertically disposed column means including surrounding wall means, plural vertically spaced horizontally disposed tray means occupying a relatively larger horizontal area portion of said column, vertically disposed tubular downcomer means occupying a relatively smaller horizontal area portion of said column, and a vapor-liquid separator means occupying said relatively larger horizontal area portion of said column spaced above each said tray means, said relatively larger horizontal area portion of said column providing a relatively large flow passage for upward flow of vapor and liquid between said tray means and separator means, and said relatively smaller horizontal area portion of said column providing flow passage means for downward flow of liquid to feed the uppermost of said tray means and downward flow of liquid from relatively higher separator means to relatively lower tray means and downward flow of liquid from the lowermost of said separator means, liquid being separated from a gas-liquid mixture by each separator means and the separated liquid being delivered into a said downcomer means by each said separator means, said vapor liquid separator means producing downflow liquid of relatively high density and substantially removing liquid from upflowing vapor whereby vertical tray spacing may be reduced resulting in reduction of apparatus height, and said tray means having relatively high upward vapor flow capacity whereby horizontal apparatus area may be reduced; operating said apparatus at tray efficiencies of up to about 92%.

2. The process of claim 1, each said separator means comprising plural vertically spaced rows of parallel horizontally equally spaced upwardly facing channels, said channels of each said row being parallel to the channels of each other said row, each said channel having a width greater than the horizontal spacing between the channels of vertically adjacent rows and being centered with respect to said horizontal spacing between the channels of each vertically adjacent row, whereby the channels of each said row horizontally overlap channels of each vertically adjacent row of channels; each said channel having a discharge end having a flow communication opening into a said downcomer means.

3. The process of claim 2, wherein there are from two to eight of said vertically spaced rows of channels.

4. The process of claim 2, wherein there are from three to four of said vertically spaced rows of channels.

5. The process of claim 2, wherein the width of each said channel plus the spacing between the channel and an adjacent channel is between about 0.5 inch and about six inches.

6. The process of claim 2, wherein the width of each said channel plus the spacing between the channel and an adjacent channel is between about one inch and about two inches.

7. The process of claim 5 or 6, wherein the fractional channel area of the separator means is defined as channel width divided by channel width plus a single adjacent spacing width and is not less than about 0.52 and is not greater than about 0.7; and wherein the spacing between vertically adjacent rows of channels is between about one-fourth and about one times the channel width plus a single adjacent spacing width; and wherein the height of the sidewalls of each channel is less than about four times the channel width; and wherein each channel has a slope downward toward its said discharge end between about 0% and about 10%.

8. The process of claim 2, wherein said flow communication opening at said discharge end of each said channel terminates upwardly at the upper surface of liquid in the channel whereby vapor flow into the downcomer means is minimized.

9. The process of claim 2, each said downcomer means having a liquid seal means at its lower end from which liquid overflows to a said tray means or to be withdrawn from the bottom of said column means.

10. The process of claim 2, 8, or 9, wherein each said separator means channel has a rectangular vertical cross section.

11. The process of claim 2, 8, or 10, said discharge end of each said channel being restricted by skirt means extending downwardly from the upper side of the channel.

12. The process of claim 1, 2, 8, or 9, wherein each said tray means comprises two vertically spaced upper and lower rows of horizontally spaced parallel thin horizontal rectangular strips, said strips of one said row being parallel to the strips of the other said row, each said strip being disposed parallel to the direction of liquid flow from a said liquid seal means and being disposed to receive said liquid flow at one of its ends, each said strip of one of said rows of strips being wider than the horizontal space between the strips of the other of said rows of strips and each said strip being centered with respect to a said horizontal space between the strips of the other of said rows of strips, the width of each said strip being between about 0.5 inch and about four inches, and the horizontal space between adjacent strips of each said row of strips being between about 65% and about 85% of the strip width, and the spacing between said upper and lower rows of strips being such that the free opening area of the tray means is between about 10% and about 30%.

13. The process of claim 2, wherein each said downcomer means extending downwardly from a said separator means comprises a single vertically disposed passage.

14. The process of claim 2, wherein each said downcomer means extending downwardly from a said separator means comprises a separate vertical passage from each said vertically spaced row of channels to said liquid seal means.

15. The process of claim 1, wherein each said tray means comprises plural horizontal parallel spaced strips arranged in staggered vertically spaced rows, and wherein each said separator means comprises plural substantially horizontal parallel spaced upwardly facing channels arranged in staggered vertically spaced rows, the width of each said strip being greater than the strip spacing width, and the width of each said channel being greater than the channel spacing width.

* * * * *